(12) United States Patent
Abdollahi et al.

(10) Patent No.: US 10,888,816 B2
(45) Date of Patent: Jan. 12, 2021

(54) PROCESS FOR PRODUCING A PURIFIED GAS STREAM

(71) Applicant: SHELL OIL COMPANY, Houston, TX (US)

(72) Inventors: Farhang Abdollahi, Montreal-East (CA); Paul-Emannuel Joseph Joseph Just, Amsterdam (NL); John Nicholas Sarlis, Calgary (CA)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 16/345,887

(22) PCT Filed: Oct. 31, 2017

(86) PCT No.: PCT/EP2017/077852
§ 371 (c)(1),
(2) Date: Apr. 29, 2019

(87) PCT Pub. No.: WO2018/083076
PCT Pub. Date: May 11, 2018

(65) Prior Publication Data
US 2020/0047117 A1     Feb. 13, 2020

(30) Foreign Application Priority Data
Nov. 1, 2016   (EP) .................... 16196691

(51) Int. Cl.
*B01D 53/75* (2006.01)
*B01D 53/14* (2006.01)
*B01D 53/86* (2006.01)

(52) U.S. Cl.
CPC ......... *B01D 53/75* (2013.01); *B01D 53/1406* (2013.01); *B01D 53/1425* (2013.01); *B01D 53/1431* (2013.01); *B01D 53/1468* (2013.01); *B01D 53/1475* (2013.01); *B01D 53/8612* (2013.01); *B01D 2252/20415* (2013.01); *B01D 2252/20447* (2013.01); *B01D 2252/504* (2013.01)

(58) Field of Classification Search
None
See application file for complete search history.

(56) References Cited

U.S. PATENT DOCUMENTS

| | | |
|---|---|---|
| 3,851,041 A | 11/1974 | Eickmeyer |
| 4,096,085 A | 6/1978 | Holoman Jr. et al. |
| 4,112,050 A | 9/1978 | Sartori et al. |
| 4,217,237 A | 8/1980 | Sartori et al. |
| 4,624,838 A | 11/1986 | Pan et al. |
| 5,019,361 A | 5/1991 | Hakka |
| 5,277,885 A | 1/1994 | Peytavy et al. |
| 5,618,506 A | 4/1997 | Suzuki et al. |
| 5,700,437 A | 12/1997 | Fuji et al. |
| 6,036,931 A | 3/2000 | Yoshida et al. |
| 6,337,059 B1 | 1/2002 | Schubert et al. |
| 6,582,498 B1 | 6/2003 | Sass et al. |
| 6,755,892 B2 | 6/2004 | Nalette et al. |
| 7,004,997 B2 | 2/2006 | Asprion et al. |
| 7,419,646 B2 | 9/2008 | Cadours et al. |
| 8,357,344 B2 | 1/2013 | Bouillon et al. |
| 2001/0021362 A1 | 9/2001 | Ishida |
| 2006/0286017 A1 | 12/2006 | Hakka |
| 2008/0159937 A1 | 7/2008 | Ouimet |
| 2010/0310439 A1* | 12/2010 | Brok ................ B01D 53/1462 423/222 |
| 2012/0216678 A1* | 8/2012 | Geuzebroek ....... B01D 53/1456 95/187 |
| 2012/0282160 A1* | 11/2012 | Just .................... B01D 53/1462 423/228 |

(Continued)

FOREIGN PATENT DOCUMENTS

| | | |
|---|---|---|
| CA | 2528205 A1 | 12/2004 |
| CA | 2532549 A1 | 2/2005 |
| CA | 2559081 A1 | 9/2005 |

(Continued)

OTHER PUBLICATIONS

Maadah, Thesis submitted to the Faculty of the Graduate College of the Oklahoma State University, May 1978. (Year: 1978).*

(Continued)

*Primary Examiner* — Anita Nassiri-Motlagh

(57) ABSTRACT

The invention relates to a process for removing hydrogen sulfide and carbon dioxide from a feed gas stream. H2S in the feed gas stream is converted to elemental sulfur in a Claus unit. At least a part of the gas stream obtained is contacted with an aqueous lean absorbing medium in an absorption zone at a pressure between 0.9 and 2 bara. The aqueous lean absorbing medium used comprises one or more amines chosen from: —a polyamine in the absence of tertiary amine functionalities having a pKa sufficient to neutralize carbamic acid, the polyamine having at least one primary amine functionality having a pKa smaller than 10.0 at 25° C., —a polyamine in the absence of tertiary amine functionalities having a pKa sufficient to neutralize carbamic acid, the polyamine having at least one secondary amine functionality having a pKa for each sorbing nitrogen smaller than 10.0 at 25° C. The process is improved as compared to a process involving Claus off-gas treatment with (activated) MDEA. Effective CO2 removal is achieved while at the same time a simplified line-up with less equipment can be used.

9 Claims, No Drawings

(56) References Cited

U.S. PATENT DOCUMENTS

2015/0151241 A1 6/2015 Critchfield et al.

FOREIGN PATENT DOCUMENTS

| | | |
|---|---|---|
| GB | 2018615 A | 10/1979 |
| JP | H05237341 A | 9/1993 |
| JP | H0731830 A | 2/1995 |
| JP | 2006150298 A | 6/2006 |
| JP | 2006167520 A | 6/2006 |
| JP | 2006218415 A | 8/2006 |
| JP | 2007245011 A | 9/2007 |
| WO | 0209849 A2 | 2/2002 |
| WO | 0213948 A2 | 2/2002 |
| WO | 2004089512 A1 | 10/2004 |
| WO | 2005097299 A1 | 10/2005 |
| WO | 2006097299 A1 | 9/2006 |
| WO | 2006107026 A1 | 10/2006 |

OTHER PUBLICATIONS

International Search Report and Written Opinion received for PCT Patent Application No. PCT/EP2017/077852, dated Dec. 15, 2017, 8 pages.

International Search Report and Written Opinion received for PCT Patent Application No. PCT/CA2007/002341, dated Apr. 22, 2008, 7 pages.

Idem et al., "Pilot Plant studies of the CO2 Capture Performance of Aqueous MEA and Mixed MEA/MDEA Solvents at the University of Regina CO2 Capture Technology Development Plant and the Boundary Dam CO2 Capture Demonstration Plant", Industrial & Engineering Chemistry Research, vol. 45, Issue No. 8, 2006, pp. 2414-2420.

\* cited by examiner

PROCESS FOR PRODUCING A PURIFIED GAS STREAM

CROSS REFERENCE TO EARLIER APPLICATION

The present application is the National Stage (§ 371) of International Application No. PCT/EP2017/077852, filed Oct. 1, 2017, which claims priority from EP Application 16196691.6, filed Nov. 1, 2016 incorporated herein by reference.

FIELD OF THE INVENTION

The invention relates to a process for removing hydrogen sulfide and carbon dioxide from a feed gas stream.

BACKGROUND TO THE INVENTION

Gas streams such as from natural gas wells typically are "sour gas" streams as they often comprise carbon dioxide and hydrogen sulfide. H2S and CO2 need to be removed before such gas streams can be further used.

Processes for removing H2S and CO2 from "sour gas" are well known in the art. Such processes typically comprise an absorption step for removing sulfur compounds and carbon dioxide from the gaseous feed stream by contacting such gaseous feed stream with a solvent, for example an amine solvent, in an absorption tower. Thus a purified gaseous stream, often referred to as 'sweet gas' is obtained and a solvent loaded with contaminants. The loaded solvent is typically regenerated in a stripper to obtain lean solvent and a gas stream comprising a relatively high concentration of H2S and CO2. The lean solvent may be recycled to the absorption tower.

The gas stream comprising a relatively high concentration of H2S and CO2 may be treated in a second absorption stage. For example, it may be subjected to a Claus process to produce elemental sulfur and a Claus off-gas. Claus off-gas is often subjected to H2S and/or CO2 removal procedures.

An often used process for removing CO2 from a Claus off-gas is treatment with methyldiethanolamine (MDEA) or with activated MDEA at an elevated pressure. However, MDEA is sensitive to degradation in the presence of H2S. Therefore H2S is often removed prior to treatment with (activated) MDEA. Treatment with (activated) MDEA is normally performed at an elevated pressure. Since Claus off-gas, also after removal of H2S, normally is at atmospheric pressure this requires pressurization of the Claus off-gas before treatment with (activated) MDEA. Additionally, due to the elevated pressure at which the process is performed, there is a limit to the size of the absorption units. Multiple compressors and multiple absorption units thus are required when handling large streams of Claus off-gas.

The present invention aims at an improved process for removing hydrogen sulfide and carbon dioxide from a feed gas stream, especially when it involves Claus off-gas treatment. One aim is to achieve effective CO2 removal. Another aim is a simplified line-up, preferably with a reduction of required equipment. Another aim is to have a process with reduced energy consumption. At the same time it is desired to have a treatment process which is less sensitive to the presence of H2S.

SUMMARY OF THE INVENTION

The invention relates to a process for removing hydrogen sulfide and carbon dioxide from a feed gas stream, the process comprising the following steps:

(i) converting hydrogen sulfide in the feed gas stream to elemental sulfur in a Claus unit, thereby obtaining elemental sulfur and a gas stream comprising a reduced amount of hydrogen sulfide and carbon dioxide;

(ii) contacting at least a part of the gas stream obtained in step (i) with an aqueous lean absorbing medium in an absorption zone to absorb carbon dioxide and to obtain a carbon dioxide lean treated gas stream and spent absorbing medium;

wherein the pressure in the absorption zone used in step (ii) is in the range of between 0.9 and 2 bara, preferably between 0.9 and 1.5 bara; and wherein the aqueous lean absorbing medium used in step (ii) comprises one or more amines chosen from:

a polyamine in the absence of an effective amount of tertiary amine functionalities having a pKa sufficient to neutralize carbamic acid, the polyamine having at least one primary amine functionality having a pKa smaller than 10.0 at 25° C., a polyamine in the absence of an effective amount of tertiary amine functionalities having a pKa sufficient to neutralize carbamic acid, the polyamine having at least one secondary amine functionality having a pKa for each sorbing nitrogen smaller than 10.0 at 25° C.

The present invention is an improved process as compared to a process involving Claus off-gas treatment with (activated) MDEA.

With a process according to the invention effective CO2 removal is achieved while at the same time a simplified line-up can be used. As there is no need to pressurize the Claus off-gas, the process can be performed with less equipment. This also results in reduced energy consumption. Furthermore, the treatment process which the above listed amines is less sensitive to the presence of H2S downstream of the Claus unit.

DETAILED DESCRIPTION OF THE INVENTION

The present invention relates to a process for removing hydrogen sulfide and carbon dioxide from a feed gas stream according to claim 1. The feed gas stream comprises hydrogen sulfide and comprises carbon dioxide and optionally comprises other contaminants such as COS.

In step (i) hydrogen sulfide in the feed gas stream is converted to elemental sulfur in a Claus unit. A gas stream comprising a reduced amount of hydrogen sulfide is obtained. Carbon dioxide is not or hardly removed by the Claus process and thus is still present in the gas stream.

Preferably the feed gas stream used in step (i) comprises up to 25 vol % of carbon dioxide.

Step (i) preferably has two steps. In step (ia) hydrogen sulfide in the feed gas stream is converted to elemental sulfur in a Claus unit, thereby obtaining elemental sulfur and a gas stream comprising a reduced amount of hydrogen sulfide and comprising carbon dioxide. In step (ib) even more hydrogen sulfide is removed from the gas stream obtained in (ia) by means of a solvent.

In step (ib) a solvent comprising an amine is used to remove hydrogen sulfide, preferably to selectively remove hydrogen sulfide and not or hardly remove carbon dioxide. A stream comprising a further reduced amount of hydrogen sulfide, and also still comprising CO2, is obtained. Preferably hydrogen sulfide is removed in step (ib) by means of a Shell Claus off-gas treating (SCOT) process. Another suitable method to remove hydrogen sulfide in step (ib) is by using a solvent such as Flexsorb (ExxonMobil).

In step (ii) at least a part of the gas stream obtained in step (i) is contacted with an aqueous lean absorbing medium in an absorption zone. Carbon dioxide is absorbed. A carbon dioxide lean treated gas stream is obtained. Spent absorbing medium is obtained.

The pressure in the absorption zone used in step (ii) is in the range of between 0.9 and 2 bara, preferably between 0.9 and 1.5 bara.

The aqueous lean absorbing medium used in step (ii) comprises one or more amines chosen from:

a polyamine in the absence of an effective amount of tertiary amine functionalities having a pKa sufficient to neutralize carbamic acid, the polyamine having at least one primary amine functionality having a pKa smaller than 10.0 at 25° C., a polyamine in the absence of an effective amount of tertiary amine functionalities having a pKa sufficient to neutralize carbamic acid, the polyamine having at least one secondary amine functionality having a pKa for each sorbing nitrogen smaller than 10.0 at 25° C.

Preferred examples of "polyamines in the absence of an effective amount of tertiary amine functionalities having a pKa sufficient to neutralize carbamic acid, the polyamine having at least one primary amine functionality having a pKa smaller than 10.0 at 25° C." are diethylenetriamine (DETA), triethylenetetramine (TETA), tetraethylenepentamine (TEPA), and mixtures thereof.

A preferred example of a "polyamine in the absence of an effective amount of tertiary amine functionalities having a pKa sufficient to neutralize carbamic acid, the polyamine having at least one secondary amine functionality having a pKa for each sorbing nitrogen smaller than 10.0 at 25° C." is N-(2-hydroxyethyl)piperazine.

As step (ii) does not need to be performed at elevated pressure there is freedom with regard to the design and the size of the absorption units. When handling large streams of Claus off-gas it will in most cases not be necessary to use multiple compressors and multiple absorption units. Rather, in most cases it will suffice to avoid using a compressor between step (i) and step (ii). Additionally or alternatively in most cases it will suffice to use a single absorption unit. Hence, in most cases a simple single train will suffice.

Preferably the gas stream which is contacted with an aqueous lean absorbing medium in an absorption zone in step (ii) has not been pressurized above 2 bara between step (i) and step (ii). Preferably the gas stream which is contacted with an aqueous lean absorbing medium in an absorption zone in step (ii) has not been pressurized in a compressor between step (i) and step (ii). The pressure of the gas stream may be a little bit above atmospheric pressure as a flow of gas is desired. The pressure of the gas stream used in step (ii) is in the range of between 0.9 and 2 bara, preferably between 0.9 and 1.5 bara.

Preferably at least 70%, preferably at least 85%, more preferably at least 95%, more preferably the entire gas stream obtained in step (i) is treated in a single absorption unit in step (ii).

The process of the present invention is not very sensitive to H2S or other sulfur components. Hence, the lean absorbing medium in an absorption zone in step (ii) may comprise hydrogen sulfide and optionally COS.

It is thus not necessary to remove the reduced amount of H2S which is still present in the gas stream to be treated in step (ii). It is thus, for example, not necessary to incinerate the gas obtained in step (i) before step (ii). Preferably the gas stream which is contacted with an aqueous lean absorbing medium in an absorption zone in step (ii) has not been incinerated between step (i) and step (ii). This saves complexity as well as equipment.

Preferably the gas stream which is contacted with an aqueous lean absorbing medium in an absorption zone in step (ii) comprises hydrogen sulfide, carbon dioxide and optionally COS.

In a preferred embodiment the process comprises the following steps after step (ii):
(iii) regenerating spent absorbing medium obtained in step (ii) in a regeneration zone to produce a regenerated aqueous absorbing medium and carbon dioxide; and
(iv) recycling at least a part of the regenerated aqueous absorbing medium obtained in step (iii) to step (ii).

In a preferred embodiment a part of the regenerated aqueous absorbing medium obtained in step (iii) is recycled to step (ii) and the process comprises the following steps after step (iv):
(v) removing heat stable salts from a second part of the regenerated aqueous absorbing medium obtained in step (iii), preferably by means of an ion exchange resin, electrodialysis, crystallization, or thermal reclamation; and
(vi) recycling at least a part of the regenerated aqueous absorbing medium obtained having a reduced heat stable salt content as obtained in step (v) to step (ii).

Preferably step (iii) is performed in a reboiler, preferably in a kettle reboiler, forced circulation reboiler, fired reboiler, falling film reboiler, direct steam reboiler, or thermosyphon, preferably in a thermosyphon.

That which is claimed is:

1. A process for removing hydrogen sulfide and carbon dioxide from a feed gas stream, the process comprising the following steps:
   (i) converting hydrogen sulfide in the feed gas stream to elemental sulfur and a gas stream, wherein step (i) comprises:
      (ia) converting hydrogen sulfide in the feed gas stream to elemental sulfur in a Claus unit, thereby obtaining elemental sulfur and a first gas stream comprising a reduced amount of hydrogen sulfide and carbon dioxide, wherein the feed gas stream comprises up to 25 vol % of carbon dioxide;
      (ib) removing additional hydrogen sulfide from the first gas stream produced in step (ia) by means of a solvent comprising an amine, thereby obtaining the gas stream comprising a further reduced amount of hydrogen sulfide relative to the first gas stream; and
   (ii) contacting at least a part of the gas stream obtained in step (ib) with an aqueous lean absorbing medium in an absorption zone to absorb the carbon dioxide and to obtain a carbon dioxide lean treated gas stream and spent absorbing medium;
   wherein a pressure in the absorption zone used in step (ii) is in a range of between 0.9 and 2 bara; and
   wherein the aqueous lean absorbing medium used in step (ii) comprises one or more amines chosen from:
      diethylenetriamine (DETA), triethylenetetramine (TETA), tetraethylenepentamine (TEPA), and mixtures thereof,
      N-(2-hydroxyethyl)piperazine.

2. The process according to claim 1, wherein at least 70% of the gas stream obtained in step (i) is treated in a single absorption unit in step (ii).

3. The process according to claim 1, wherein the gas stream which is contacted with the aqueous lean absorbing medium in the absorption zone in step (ii) has not been incinerated between step (i) and step (ii).

4. The process according to claim 1, wherein the gas stream which is contacted with the aqueous lean absorbing medium in the absorption zone in step (ii) comprises hydrogen sulfide, carbon dioxide and optionally COS.

5. The process according to claim 1, wherein the process has the additional steps of:
(iii) regenerating the spent absorbing medium obtained in step (ii) in a regeneration zone to produce a regenerated aqueous absorbing medium and carbon dioxide; and
(i) recycling at least a part of the regenerated aqueous absorbing medium obtained in step (iii) to step (ii).

6. The process according to claim 5, wherein in step (i) a part of the regenerated aqueous absorbing medium obtained in step (iii) is recycled to step (ii), and the process has the additional steps of:
(v) removing heat stable salts from a second part of the regenerated aqueous absorbing medium by means of an ion exchange resin, electrodialysis, crystallization, or thermal reclamation to generate a second regenerated aqueous absorbing medium having a reduced heat stable salt content; and
(vi) recycling at least a part of the second regenerated aqueous absorbing medium as obtained in step (v) to step (ii).

7. The process according to claim 5, wherein step (iii) is performed in a reboiler, in a kettle reboiler, forced circulation reboiler, fired reboiler, falling film reboiler, direct steam reboiler, or thermosyphon.

8. The process according to claim 1, wherein the pressure of the gas stream is not pressurized above 2 bara between steps (i) and (ii).

9. The process according to claim 1, wherein the pressure of the gas stream used in step (ii) is in a range of between 0.9 and 2 bara.

\* \* \* \* \*

UNITED STATES PATENT AND TRADEMARK OFFICE
CERTIFICATE OF CORRECTION

PATENT NO. : 10,888,816 B2
APPLICATION NO. : 16/345887
DATED : January 12, 2021
INVENTOR(S) : Farhang Abdollahi et al.

Page 1 of 1

It is certified that error appears in the above-identified patent and that said Letters Patent is hereby corrected as shown below:

In the Specification

In Column 1, Line 8, delete "Oct. 1, 2017," and insert -- Oct. 31, 2017, --, therefor.

Signed and Sealed this
Ninth Day of March, 2021

Drew Hirshfeld
*Performing the Functions and Duties of the
Under Secretary of Commerce for Intellectual Property and
Director of the United States Patent and Trademark Office*